United States Patent Office 3,323,999
Patented June 6, 1967

3,323,999
DIURETIC COMPOSITIONS
Bohdan R. Nechay and Thomas H. Maren, Gainesville, Fla., assignors, by direct and mesne assignments, to Carter-Wallace, Inc., a corporation of Maryland
No Drawing. Filed Sept. 15, 1964, Ser. No. 396,751
4 Claims. (Cl. 167—65)

The present invention relates to diuretic compositions. More particularly, the invention relates to a synergistic mixture of diuretics having excellent natriuretic and chloruretic properties.

Diuretic compounds have become of significant importance in the reduction or elimination of edema and other symptoms usually associated with the retention of excessive amounts of sodium ions in the body.

Methylated xanthines, such as theophylline and caffeine, have an appreciable diuretic action. This activity, coupled with the absence of serious toxic effects, led to the clinical use of these compounds as diuretic agents. However, the relatively weak diuretic action of methylated xanthines made it necessary to administer such compounds in dosages which tended to cause untoward reactions, such as nervousness, insomnia and gastric distress. Therefore, the xanthines are rarely used as diuretics at the present time due to the availability of a number of more effective diuretics.

More recently, carbonic anhydrase inhibitors, exemplified by acetazolamide, have been used extensively as diuretics. While such compounds have an effect on the excretion of sodium ions, they also promote the excretion of bicarbonate, rather than chloride, ions. Thus, this class of compounds has limited effectiveness. Furthermore, the use of currently available carbonic anhydrase inhibitors is contraindicated in patients with impaired pulmonary functions since in many cases such patients are physiologically unable to eliminate the increased volume of carbon dioxide which is formed in the venous blood as a resulut of carbonic anhydrase inhibition. Such carbon dioxide retention makes it impossible to administer most carbonic anhydrase inhibitors to patients with impaired lung functions for prolonged periods.

It is an object of the present invention to provide novel diuretic compositions substantially free of undesirable side effects. It is another object of the invention to provide novel diuretic compositions having a marked synergistic effect on sodium and chloride excretion. It is a further object of the invention to provide novel diuretic compositions having a selective action on renal excretion. It is a still further object of the invention to provide an improved method of inducing diuresis in a warm-blooded animal. These and other objects will become apparent to one skilled in the art in the light of the instant specification.

In its broad aspect, the present invention relates to a diuretic composition comprising a pharmaceutically effective amount of a mixture of (a) a carbonic anhydrase inhibitor selected from the group consisting of 6-ethoxybenzothiazole-2-sulfonamide, 5-acetylimino-4-methyl-$\Delta^2$-1,3,4-thiadiazoline-2-sulfonamide and 5-benzenesulfamyl-1,3,4-thiadiazole-2-sulfonamide and (b) a compound selected from the group consisting of theophylline and pharmaceutically acceptable adducts thereof. The compositions of the present invention are low in toxicity, substantially free of undesirable side effects, and have unexpected synergistic activity.

The carbonic anhydrase inhibitors of the present invention are known compounds and have been described in the chemical and patent literature.

The 6-ethoxybenzothiazole-2-sulfonamide, generically known as ethoxzolamide, can be prepared by the method described in British patent specification No. 795,174. The 5 - acetylimino - 4-methyl-$\Delta^2$-1,3,4-thiadiazoline-2-sulfonamide, generically known as methazolamide, can be produced following the teaching of British patent specification No. 781,418. Methods of preparing the remaining compound, 5-benzene sulfamyl-1,3,4-thiadiazole-2-sulfonamide, are described in U.S. Patent No. 2,721,204. As will become apparent from the data which follows hereinafter, the three above-mentioned compounds are inhibitors of carbonic anhydrase and, therefore, have negligible effect on the excretion of chloride ions.

As the second component, there is employed theophylline or a pharmaceutically acceptable adduct thereof. As used herein and in the appended claims, the term ""pharmaceutically acceptable adduct"" signifies substantially non-toxic adducts of theophylline such as, for example, aminophylline, theophylline monoethanolamine, theophylline diethanolamine, theophylline calcium salicylate, and the like.

The essential components of the composition are preferably used in a ratio of from about 5 to about 30 parts by weight of theophylline per part of carbonic anhydrase inhibitor. It is understood that when the theophylline is supplied in the form of an adduct, correspondingly higher ratios are used in order to provide the desired amount of free theophylline.

The effect of the present compositions on electrolyte excretion were determined in adult trained beagles, weighing from 8 to 12 kg. The diet consisted of equal portions of non-medicated dog food and canned horse meat supplemented with vitamins A and D. Tap water was available ad libitum.

All tests were performed in conscious animals fasted for a period of 24 hours. None of the animals were used more than once a week. Urine was collected by catheterization under a layer of toluene in graduated cylinders for two 30-minute periods before administration and two 30-minute periods after administration of the drugs. The bladder was washed twice with 10 ml. of sterile distilled water at the end of each urine collection period and prior to the collection of the first sample. Each test animal received 20 ml. of water per kg. of body weight by stomach tube 90 minutes before the administration of the drugs.

Drugs were given in single intravenous doses in distilled water, in volume of 1 ml. per kg. of body weight. The carbonic anhydrase inhibitors were dissolved by the addition of sodium hydroxide in an amount just sufficient to achieve solution. Theophylline was used in the form of aminophylline. Each dosage was tested in from 3 to 8 animals.

In administering the present combinations, solutions of the two components were admixed in a syringe prior to injection and given simultaneously.

Results of the tests are tabulated in Table I which follows. Dosages are given in mg. of active ingredient per kg. of body weight.

TABLE I

| Active Ingredient and Dosage | Mean Urinary Excretion Rate for 60 Minutes after Dose ($\mu$eq/min.) | | |
|---|---|---|---|
| | Cl- | HCO$_3$- | Na+ |
| None (control) | <20 | <20 | <20 |
| Aminophylline (27 mg./kg.)[1] | 141 | <10 | 108 |
| 5-Benzenesulfamyl-1,3,4-thiadiazole-2-sulfonamide (1 mg./kg.) | 10 | 88 | 56 |
| Aminophylline (27 mg./kg.) plus 5-benzenesulfamyl-1,3,4-thiadiazole-2-sulfonamide (1 mg./kg.) | 186 | 198 | 261 |
| 5-Benzenesulfamyl-1,3,4-thiadiazole-2-sulfonamide (10 mg./kg.) | 32 | 116 | 128 |
| Aminophylline (27 mg./kg.) plus 5-benzenesulfamyl-1,3,4-thiadiazole-2-sulfonamide (10 mg./kg.) | 223 | 208 | 333 |
| Ethoxzolamide (5 mg./kg.) | 25 | 134 | 116 |
| Aminophylline (27 mg./kg.) plus ethoxzolamide (5 mg./kg.) | 306 | 231 | 444 |
| Methazolamide (10 mg./kg.) | 51 | 133 | 173 |
| Aminophylline (27 mg./kg.) plus methazolamide (10 mg./kg.) | 215 | 140 | 290 |

[1] Equivalent to 20 mg./kg. of theophylline.

As is apparent from the above results, the compositions of the invention have diuretic properties of a kind and degree which were totally unexpected. For example, 5 - benzenesulfamyl - 1,3,4 - thiadiazole - 2 - sulfonamide, which has no chloruretic effects, potentiates the urinary elimination of chloride ion due to theophylline. On the other hand theophylline, which per se has substantially no effect on bicarbonate ion excretion, synergizes such effect in 5 - benzenesulfamyl - 1,3,4-thiadiazole-2-sulfonamide. Such mutual potentiation is surprising and unexpected in the light of the prior art.

The compositions of the invention are preferably administered orally in the form of tablets, capsules, or the like. The present compositions can also be administered by injection as a solution or suspension in sterile water or isotonic saline solution.

What we claim is:

1. A diuretic composition comprising a pharmaceutically effective amount of a mixture of a carbonic anhydrase inhibitor selected from the group consisting of 6-ethoxybenzothiazole - 2-sulfonamide, 5-acetylimino-4-methyl-$\Delta^2$-1,3,4-thiadiazoline-2-sulfonamide and 5-benzenesulfamyl-1,3,4-thiadiazole-2-sulfonamide and a compound selected from the group consisting of theophylline and aminophylline.

2. A diuretic composition comprising a pharmaceutically effective amount of a mixture of a carbonic anhydrase inhibitor selected from the group consisting of 6-ethoxybenzothiazole - 2-sulfonamide, 5-acetylimino-4-methyl-$\Delta^2$-1,3,4-thiadiazoline-2-sulfonamide and 5-benzenesulfamyl-1,3,4-thiadiazole-2-sulfonamide and a compound selected from the group consisting of theophylline and aminophylline, said components being present in a proportion of from about 5 to about 30 parts by weight of theophylline per part by weight of the carbonic anhydrase inhibitor.

3. A method of inducing diuresis in a warm-blooded animal which comprises administering to said animal a diuretic composition comprising a pharmaceutically effective amount of a mixture of a carbonic anhydrase inhibitor selected from the group consisting of 6-ethoxybenzothiazole - 2-sulfonamide, 5-acetylimino-4-methyl-$\Delta^2$-1,3,4-thiadiazoline-2-sulfonamide and 5-benzenesulfamyl-1,3,4-thiadiazole-2-sulfonamide and a compound selected from the group consisting of theophylline and aminophylline.

4. A method of inducing diuresis in a warm-blooded animal which comprises administering to said animal a diuretic composition comprising a pharmaceutically effective amount of a mixture of a carbonic anhydrase inhibitor selected from the group consisting of 6-ethoxybenzothiazole - 2-sulfonamide, 5-acetylimino-4-methyl-$\Delta^2$-1,3,4-thiadiazoline-2-sulfonamide and 5-benzenesulfamyl-1,3,4-thiadiazole-2-sulfonamide and a compound selected from the group consisting of theophylline and aminophylline, said components being present in a proportion of from about 5 to about 30 parts by weight of theophylline per part by weight of the carbonic anhydrase inhibitor.

References Cited

UNITED STATES PATENTS

| | | | |
|---|---|---|---|
| 2,756,229 | 7/1956 | Stoll et al. | 167—65 |
| 2,776,288 | 1/1957 | Fand | 167—65 |
| 2,799,674 | 7/1957 | Persch et al. | 167—65 |
| 2,868,800 | 1/1959 | Korman | 167—65 |
| 2,883,380 | 4/1959 | Persch et al. | 167—65 |
| 2,928,833 | 3/1960 | Leake et al. | 167—65 |
| 3,157,572 | 11/1964 | Card | 167—65 |

ALBERT T. MEYERS, *Primary Examiner.*

SAM ROSEN, *Examiner.*

L. B. RANDALL, *Assistant Examiner.*